United States Patent [19]
Huang et al.

[11] Patent Number: 5,626,448
[45] Date of Patent: May 6, 1997

[54] TOOL PULLING FORCE MAGNIFICATION MECHANISM OF SPINDLE

[75] Inventors: Chun-Hung Huang; Tong-Jou Shien, both of Hsinchu, Taiwan

[73] Assignee: Industrial Technology Research Institute, Hsinchu, Taiwan

[21] Appl. No.: 414,805

[22] Filed: Mar. 31, 1995

[51] Int. Cl.⁶ ................................................. B23B 31/10
[52] U.S. Cl. ........................ 409/233; 409/230; 409/231
[58] Field of Search .................................. 409/230, 231, 409/232, 233

[56] References Cited

U.S. PATENT DOCUMENTS 5,022,278  6/1991  DeCaussin ........................ 409/233

FOREIGN PATENT DOCUMENTS 1458109   2/1989   Russian Federation ............. 409/232
1512714  10/1989   Russian Federation ............. 409/232
1613250  12/1990   Russian Federation ............. 409/232

Primary Examiner—M. Rachuba
Assistant Examiner—Christopher Kirkman
Attorney, Agent, or Firm—W. Wayne Liauh

[57] ABSTRACT

An improved tool pulling force magnification mechanism for use in a spindle is disclosed. It comprises: (a) a draw bar contained in the hollow portion of the spindle shaft, the draw bar having a front end and a back relative to a tool to be pulled; (b) a spring sleeved on the draw bar at the back end thereof, (c) a slider located at the back end of the draw bar behind the spring to receive a squeezing force therefrom, the slider is provided with a first ring slot having a first forwardly tapered surface on an outer surface thereof; (d) a second ring slot having a second forwardly tapered surface formed on an external surface of the hollow portion of the shaft near the first forwardly tapered ring slot; and (e) a recess provided at the back end of the draw bar having an end face. The first forwardly tapered ring slot, the second forwardly tapered ring slot, and the recess are so structured such that (i) during a pulling action, a pulling force equaling to a spring force from the spring acting on the ball at the end face plus a compressing force from the shaft acting on the ball at the second forwardly tapered surface will be generated, and (ii) during a releasing action, the ball will roll into the first ring slot and the compressing force from the shaft at the second forwardly tapered surface is no longer acting on the ball, so that only a releasing force that can overcome the spring force will be required.

4 Claims, 5 Drawing Sheets

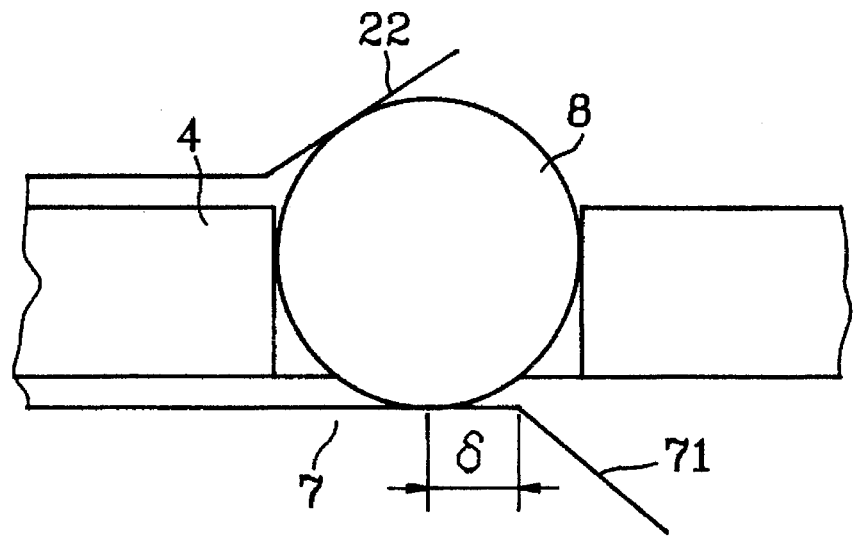
F I G. 6
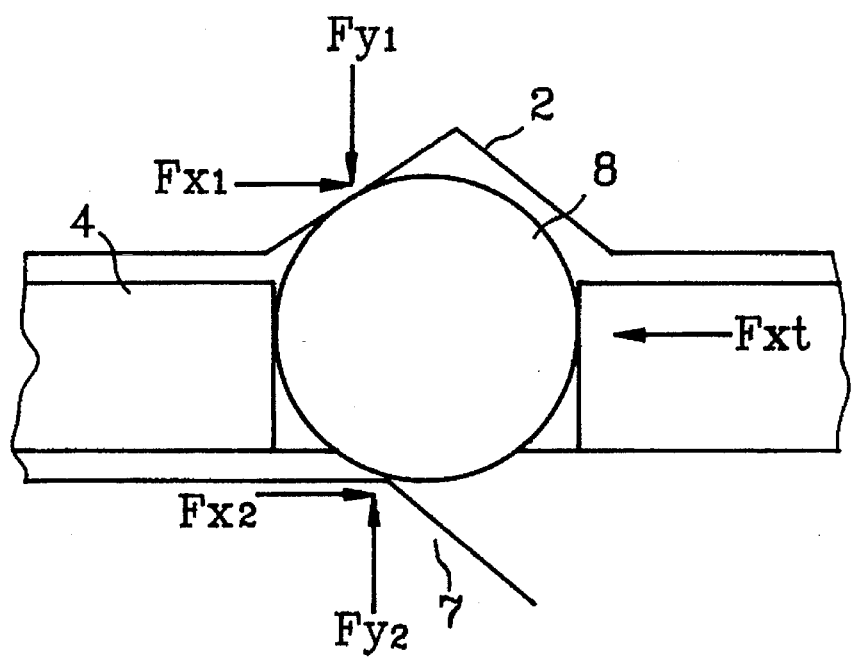
F I G. 4

TOOL PULLING FORCE MAGNIFICATION MECHANISM OF SPINDLE

FIELD OF THE INVENTION

The present invention is related to a kind of tool pulling force magnification mechanism of spindle, particularly a spindle tool changer used in machine centers which can magnify the tool pulling force to reduce the tool releasing force required and thereby reduce the size of releasing force's hydraulic cylinder and spindle spring, also lower the leading of the bearings etc.

BACKGROUND OF THE INVENTION

As shown in FIG. 1, in order to attain the function of tool changing, the spindles of the prior art's machine center are all equipped with a tool pulling mechanism in their shafts. The said tool pulling mechanism consists of a tool 1, a spindle shaft 2, balls 3, a draw bar 4 and springs 5 etc. The tool pulling force of the said tool pulling mechanism is mainly generated by the springs contained in the mechanism and is approximately equal to the acting spring force. The magnitude of the said tool pulling force can be as high as 700~2000 kg or higher depending on the designed capacity of the said tool pulling mechanism.

But the prior art's tool pulling mechanism as stated above, must have the thrust, generated by the tool releasing hydraulic cylinder, greater than the tool pulling force to dominate the spring action, i.e. the tool releasing force must be greater than the tool pulling force such that it can make the tool separate from the shaft. Limiting by this, the force releasing hydraulic cylinder and the bearing loading as well as the shaft spring can not be reduced, which is inconvenient to the part selection.

Therefore, it is understood that the spindle tool pulling mechanism of the prior art as stated above is obviously inconvenient and having shortcomings in practical usage and on the manufacturing production and is expected to have rooms to improve.

Inasmuch, the inventors, having the thinking of improving the aforesaid shortcomings and being accompanied with the application of the theory, have devoted themselves in studies and eventually produced the present invention with rational design and effective improvement on the aforesaid shortcomings.

SUMMARY OF THE INVENTION

The primary objective of the present invention is to provide a kind of tool pulling force magnification mechanism. By use of the set up of the said tool pulling force magnification mechanism, it can make the spindle's pulling force magnifies while the tool releasing force doesn't need to be magnified, in doing so, it can lower the requirement of the tool releasing force and in consequence, the hydraulic cylinder of releasing force can be smaller in size, the releasing force can be lowered, also the bearing loading as well as the shaft spring can be reduced. This is convenient for the selection of other parts.

The features of the present invention lies in the set up of several holes in which balls are contained, at the draw bar's back end of the spindle's tool pulling force mechanism. The ball are squeezed or released by a slider contained in the draw bar. The slider's squeezing force is applied by a spring while its releasing force is applied by the tool releasing force from the back end of the spindle. The balls, being squeezed, will protrude out to the outside diameter of the back end of the draw bar in order to keep the tool pulling mechanism from being released and to keep the draw bar with tool pulling force, also the releasing of the balls will cause the tool releasing of the tool pulling mechanism, thereby, it possesses the function of magnification of pulling force.

BRIEF DESCRIPTION OF THE DRAWINGS

FIG. 4 is the force diagram of the ball which illustrates the principle of pulling force magnification of the present invention.

FIG. 6 is an another embodiment of the force diagram of the ball of the present invention. Where the numbers represent the following parts:

| | | | |
|---|---|---|---|
| 1 | Tool | 5 | Spring |
| | 11 Pull stud | 6 | Spring force transmitter |
| 2 | Spindle shaft | | 61 Center hole |
| | 21 Cone hole | | 62 Bulger |
| | 22 Taper | 7 | Slider |
| 3 | Ball | | 71 Taper |
| 4 | Draw bar | | 72 Slot |
| | 41 Male screw | | 73 Spring |
| | 42 Draw bar main body | 8 | Ball |
| | 43 Female screw | 9 | Screw nut |
| | 44 Slot | | |
| | 45 Hole | | |

DETAILED DESCRIPTION OF THE INVENTION

Figure 1:
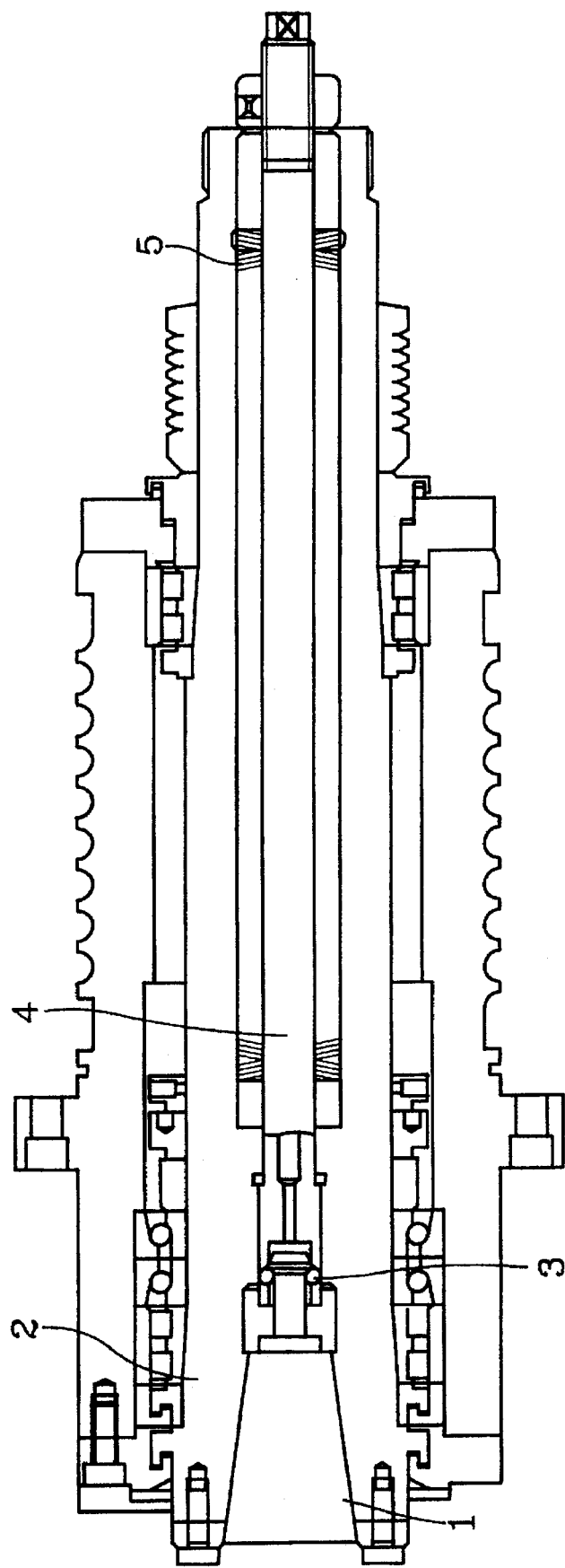
FIG. 1 is a longitudinal section view of the spindle's tool pulling force mechanism of the prior art.
Figure 2:
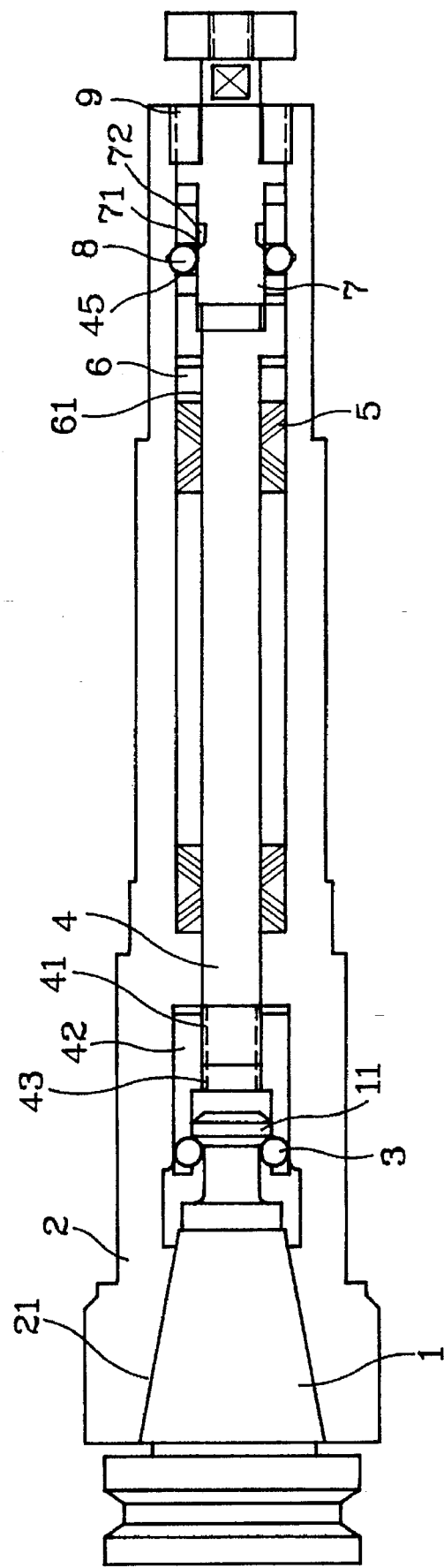
FIG. 2 is a longitudinal section view of the present invention.

To facilitate your honor examiners to further understand and consent the objectives and features as well as efficacious of the present invention, a detailed explanation in conjunction with drawings is as follows:

First of all, please refer to FIG. 1 which is the longitudinal section view of the present invention. It is a tool pulling mechanism of the spindle shaft, which generally consists of a tool 1, a spindle shaft 2, balls 3, a draw bar 4 and springs 5 etc. of parts. Among them, the draw bar 4 is contained inside the hollow part of the spindle shaft 2. The front end of the draw bar 4 has male screw 41 which can engage with the female screw 43 of the main body 42 of a draw bar and it is by this engagement that one can adjust the total length of the draw bar. There are several ball 3 contained close to the front end of the draw bar's main body 42. By means of these ball 3, it can generate a function to buckle up the pull stud 11 at the back end of the tool 1. The ball 3 can buckle up tight, the pull stud 11 if the draw bar 4 is subjected to a pulling force but the ball will slide into the area with larger inside diameter of the spindle shaft 2 if the draw bar is subjected to a sufficient pushing force which make the tool come off from the shaft 2. It is not necessary to go into details here since these structures of spindle pulling force mechanism are mostly the same as those of the prior art.

Figure 3:
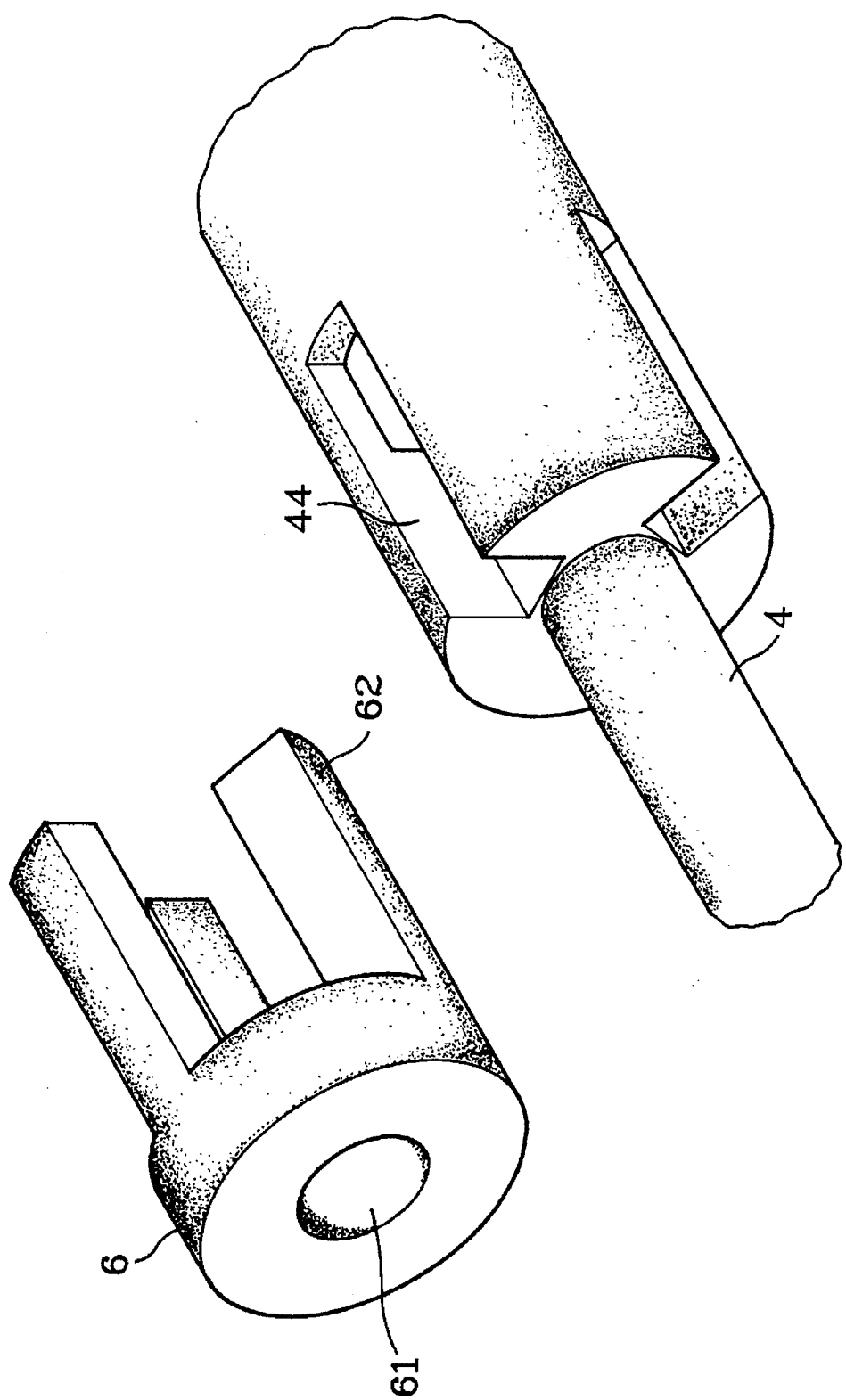
FIG. 3 is an isometric drawing of the draw bar's back end and the spring force transmitter of the present invention.

The outside diameter of the middle section of the draw bar is relatively smaller and the outside diameter of the back end is relatively larger and become a hollow one. The part between the middle section and the back end of the draw bar is also milled into the shape shown in FIG. 3. The back end part of the draw bar 4 has larger diameter and is equipped, in equal-angle internals, with several slot 44 penetrated into the inside of the hollow part. A spring force transmitter 6 with its center hole 61 slips on to fit the outside diameter of the middle section of the draw bar 4, and with its back end equips, in equal-angle intervals, with several bulgers 62 to fit into their corresponding slots 44. What is more, the inside diameter of these bulgers is smaller than the inside diameter of the hollow part of the draw bar's back end such that the inside diameter of the bulgers, when they fit into the slots, will exceeds the hollow part's inside diameter of the draw bar's back part in order to touch the slider 7. The spring 5 is a kind of bevel cone spring which slips on the draw bar 4 and presses against the front end surface of the spring force transmitter 6 such that the spring force transmitter 6, can slide axially toward the back end part of the draw bar 4. A cylindrical slider 7, with its front end part fits into the hollow back end part of the draw bar 4, and by use of the stage difference between the back end part's inside diameter of the draw bar 4 and the inside diameter of the spring force transmitter 6, can push the front end surface of the slider 7 with its back end surface. The slider 7 is equipped, at its center part, with a ring of slot 72 having a taper shape 71 of cross section. The holes 45, equipped at the back end part of the draw bar 4, contains balls 8. By means of a screw nut 9 tight screwed at the back end of the shaft 2, the draw bar 4 fixes various pans inside the shaft in position. Thus the elements, including the back end of the draw bar 4 and slide 7 together with ball 8 etc. constructs a tool pulling force magnification mechanism.

During the machining process, the tool 1, of the present invention's mechanism, is set inside the cone hole 21 of the spindle shaft 2. The tool's pull stud 11 is buckled by the balls 3 which is subjected to the pulling force of the draw bar. At this moment, the bevel cone spring 5 is compressed and its acting force is applied to the cylindrical slider 7 through the spring force transmitter 6, then, the taper 71 in the slot 72 of the cylindrical slider 7, squeeze the balls 8 till they protrude out to the outside diameter of the draw bar's back end so as to keep the tool pulling mechanism from being released and in the meantime, because of the action of the force component of the taper as shown in FIG. 4, the pulling force of the draw bar 4 will dominate the spring force acting on the slider 7.

During the tool releasing, the tool releasing force (generated by hydraulic or pneumatic cylinders) of the present invention's mechanism is applied to the slider 7 in opposite direction to compress the spring 5, thereby, the cylindrical slider 7 can slide forward and the balls 8 can be released at once and can slide into the slot 72 on the cylindrical slider 7, thereafter, the draw bar can be pushed forward to complete the tool releasing action.

As shown in FIG. 4, the crucial point of the present invention to attain the object that the tool releasing force is less than the tool pulling force, lies in the force magnification mechanism at the back end part of the tool pulling mechanism, as shown in the figure, the principle is as follows:

Let $Fx_2$ be the compression force of the spring 5 acting on the cylindrical slider 7 through the spring force transmitter 6. $Fx_2$ acts on the ball 8. Because of the action of the force components $Fxt=Fx_1+Fx_2$ where Fxt is the pulling force of the draw bar 4. It is understood that the draw bar's pulling force Fxt is greater than the force generated by spring 5. On the other hand, one needs only to dominate $Fx_2$ when it comes to tool releasing, thereby, one can soon attain the object that tool releasing force is less than tool pulling force.

Figure 5:
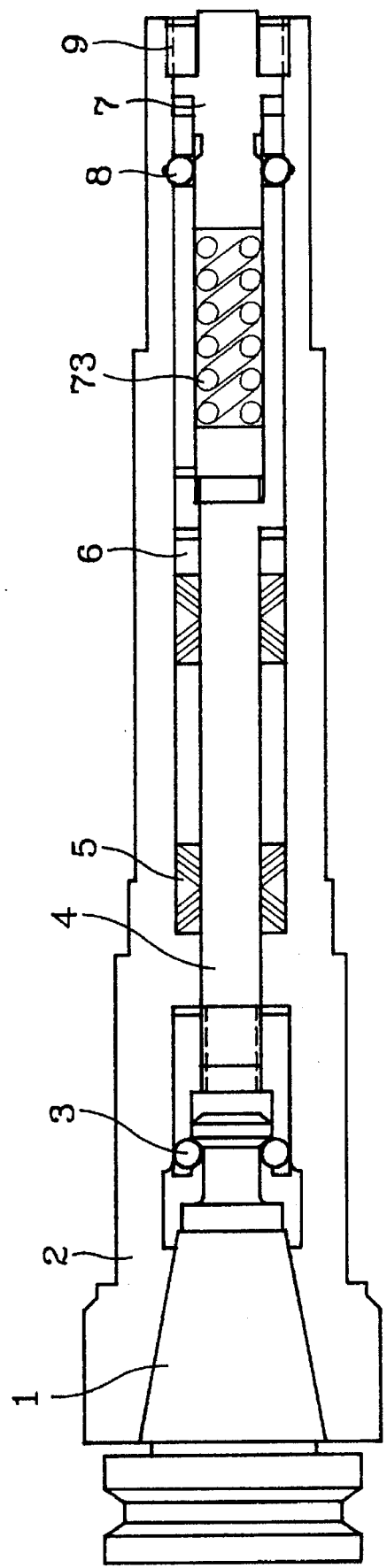
FIG. 5 is the schematic diagram of the slider and the spring force transmitter equipped with spring of the present invention.

What is more, the present invention can also install an additional spring 73 between the cylindrical slider 7 and spring force transmitter 6 as shown in FIG. 5. As shown in FIG. 6, the cylindrical slider 7 of the present invention squeezes the balls 8. The way of force acting can be pressed against by the taper 22 and ball 8 or kept the balls 8 a small distance 8 away from the taper 71 of the slider 7, inasmuch, it can attain the efficacy of positively tight buckling up the tool.

To summarize the foregoing statements, the present invention possesses the prior art's spindle tool pulling structure and provides the resolution of the efficacy the tool releasing force must be greater than the tool pulling force. The overall operation possesses in the depth of concrete embodiments. Besides, the present invention is not seen in the application on the market and is in a accordance with the requirements of innovative and progressive characteristics of patent application. The inventors here cordially ask a favor of your honor examiners to examine and approve to grant a patent.

What is claimed is:

1. A tool pulling force magnification mechanism for use in a spindle, said spindle having a hollow portion and said tool pulling force magnification mechanism comprising:

a draw bar, contained in the hollow portion of the spindle shaft, said draw bar having a front end and a back end relative to a tool to be pulled;

a spring, sleeved on the draw bar at the back end therefore;

a slider, located at the back end of the draw bar behind the spring to receive a squeezing force therefrom, said slider is provided with a first ring slot having a first forwardly tapered surface on an outer surface thereof;

a second ring slot having a second forwardly tapered surface formed on an external surface of the hollow portion of the spindle shaft near the first forwardly tapered ring slot;

a hole provided at the back end of the draw bar having an end face;

wherein the first forwardly tapered ring slot, the second forwardly tapered ring slot, and the hole are so structured such that (a) during a pulling action, a pulling force equal to a spring force from the spring acting on the ball at the end face plus a compressing force from the spindle shaft acting on the ball at the second forwardly tapered surface will be generated, and (b) during a releasing action, forwardly tapered surface is no long acting on the ball, so that only a releasing force that can overcome the spring force will be required.

2. The tool pulling force magnification mechanism for use in a spindle as claimed in claim 1, which further comprises a spring force transmitter means for transmitting the spring force from the spring to the slider.

3. The tool pulling force magnification mechanism for use in a spindle as claimed in claim 2 which further comprises a second spring disposed between the slider and the spring force transmitter.

4. The tool pulling force magnification mechanism for use in a spindle as claimed in claim 3, wherein the second spring is structured such that, during the pulling action, the second spring causes the ball to move a small distance from a front end of the first forwardly tapered surface.

* * * * *